UNITED STATES PATENT OFFICE.

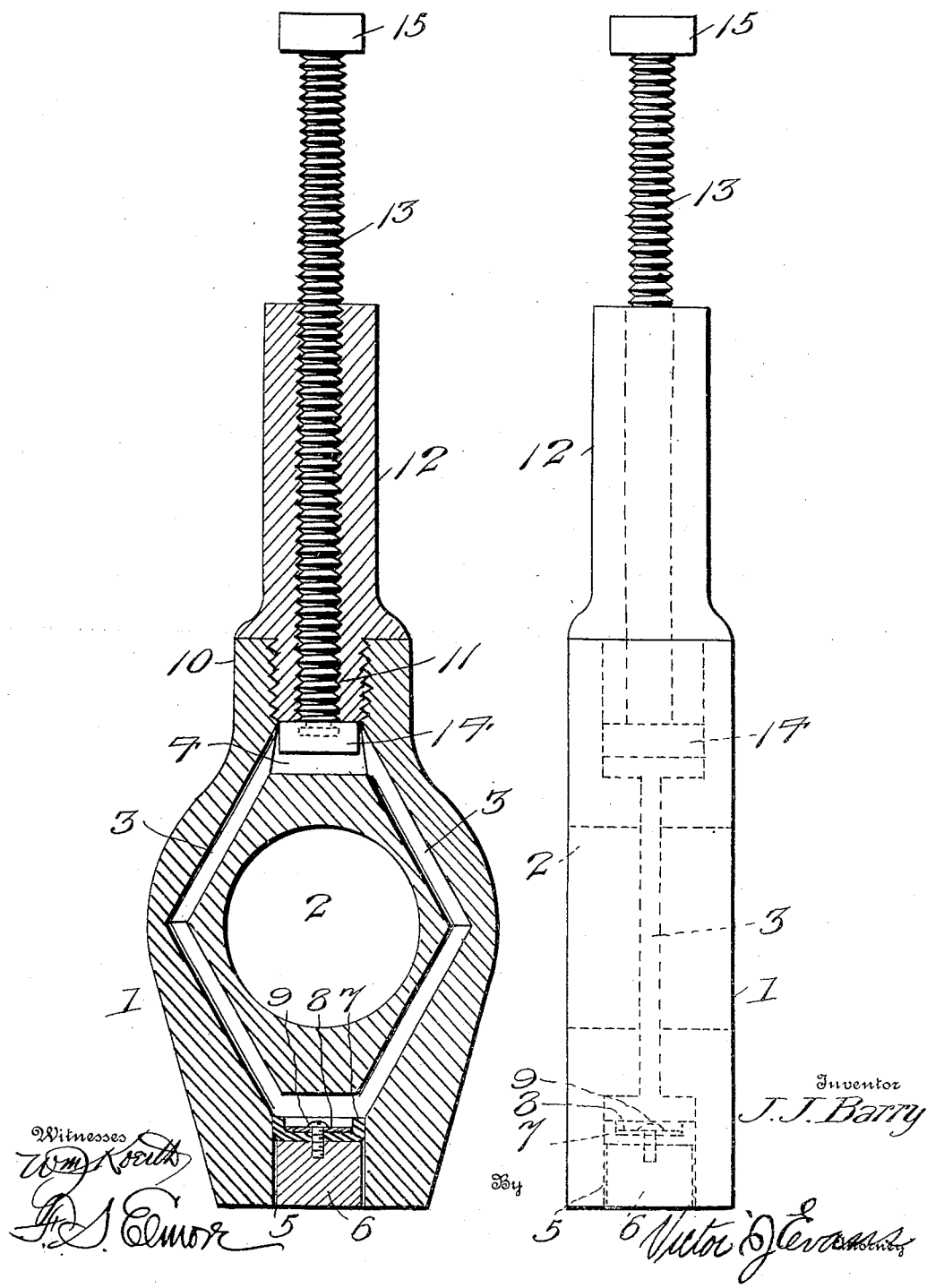

JOHN JOSEPH BARRY, OF NASHVILLE, TENNESSEE.

HYDRAULIC PRESSURE DEVICE.

No. 814,508.  Specification of Letters Patent.  Patented March 6, 1906.

Application filed June 27, 1905. Serial No. 267,269.

*To all whom it may concern:*

Be it known that I, JOHN JOSEPH BARRY, a citizen of the United States of America, residing at Nashville, in the county of Davidson and State of Tennessee, have invented new and useful Improvements in Hydraulic Pressure Devices, of which the following is a specification.

This invention relates to hydraulic pressure devices designed especially for disconnecting engine-pistons from their cross-heads, and has for its objects to produce a comparatively simple inexpensive device of this character by means of which the said parts may be disconnected without injury to either, one which in practice may be readily connected to the cross-head, and one wherein the maximum amount of pressure will be exerted for removing pistons which offer undue resistance.

With these and other objects in view the invention comprises the novel features of construction and combination of parts more fully hereinafter described.

In the accompanying drawings, Figure 1 is a central longitudinal section through a pressure device embodying the invention. Fig. 2 is an edge elevation of the same.

Referring to the drawings, 1 designates a body or head composed of metal or other suitable material, having a central transverse opening 2 and provided with internal channels or ducts 3, communicating at one end with an internal space or chamber 4 and at the other end with a chamber 5, designed to receive a movable pressure member or piston 6, equipped at its inner end with a packing member or gasket 7, secured in place by means of a clamping member or plate 8, and a fastening member or screw 9, said packing being adapted to render the pressure member liquid-tight in the chamber 5.

The chamber 4 is disposed in alinement with the central bore of an internally-threaded tubular neck or extension 10, provided on the body to receive the reduced threaded portion or extension 11 of an internally-threaded tubular bearing member or stem 12, in which is threaded a plunger element or screw 13, equipped at its inner end with a head or plunger 14, disposed in the chamber 4, and at its outer end with a head 15, designed for engagement by a suitably-operating tool, it being understood that the chamber 4 and channels 3 will in practice be filled to their utmost capacity with oil or other suitable liquid.

In operation, supposing the parts to be in their normal positions with the pressure-head 6 lying within the chamber 5 and the screw 13 and its plunger 14 retracted, as in Fig. 1, the device is applied for use by introducing the same into a cross-head with the member 6 positioned over the end of the piston-rod of the engine and entering the cross-head pin through the opening 2, thus to fix the body 1. After the device has been properly arranged the plunger-screw 13 is manipulated through the medium of a suitable tool engaged with the head 15 for moving the plunger 14 into the chamber 4, thus exerting pressure through the medium of the liquid contained therein and within the ducts 3 upon the pressure-head 6 for projecting the latter forwardly from the chamber 5, thus causing the pressure member to act upon and disconnect the piston-rod from the cross-head, as will be readily understood.

From the foregoing it is apparent that I produce a simple efficient device admirably adapted for the attainment of the ends in view, one in which the body will be fixedly secured against movement during operation of the parts to disconnect the piston-rod and cross-head, it being understood that minor changes in the details of construction may be resorted to without departing from the spirit of the invention.

Having thus described the invention, what I claim is—

1. In a device of the class described, a body provided with a transverse opening and having a pair of chambers, a duct connecting said chambers and adapted to receive a liquid, a pressure member disposed in one of said chambers for projection therefrom, and a plunger in the other chamber and operating through the medium of the liquid to project the pressure member.

2. In a device of the class described, a body having an opening to receive a connecting-pin and provided with a pair of chambers, a liquid-receiving duct connecting and communicating with said chambers, a pressure-head movable in one of the chambers for projection beyond the body, and a plunger operatively disposed in the other chamber to act upon the liquid for projecting the pressure-head.

3. In a device of the class described, a body having an opening to receive a connecting-pin and provided with a pair of chambers, a liquid-receiving duct connecting and communicating with said chambers, a pressure-head movable within one of the chambers for projection beyond the adjacent face of the body, a tubular stem carried by the latter, a plunger disposed in the other chamber, and a plunger-screw threaded through the stem and operatively connected with the plunger.

In testimony whereof I affix my signature in presence of two witnesses.

JOHN JOSEPH BARRY.

Witnesses:
WILLIAM A. ROACHE,
THOMAS L. AHEARN.